Figure 1:
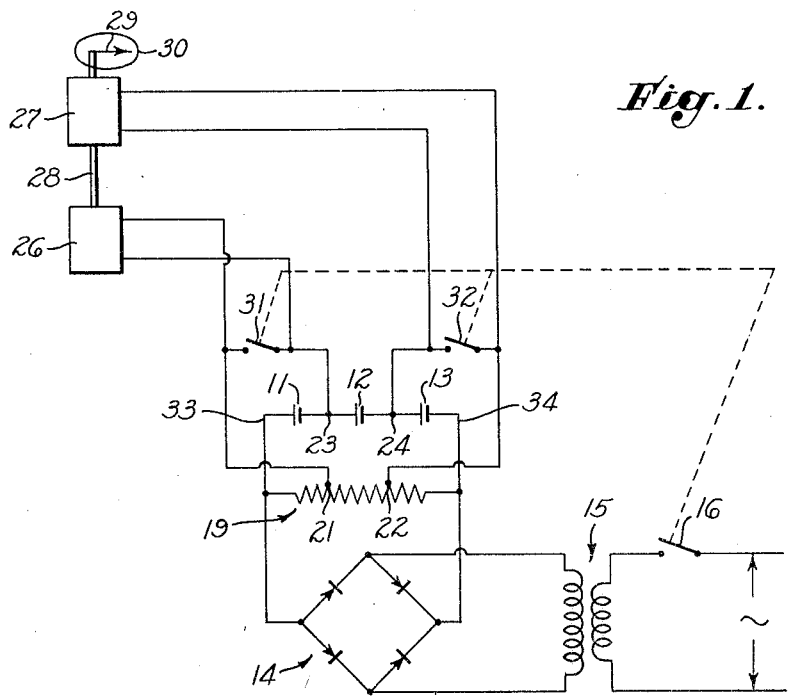

June 30, 1953  S. L. CHRISTIE ET AL  2,644,132

BATTERY TESTING METHOD

Filed Nov. 8, 1948

INVENTORS.
SOREN L. CHRISTIE
FRANK C. MARSHALL
BY THEIR ATTORNEYS.
HARRIS, KIECH, FOSTER & HARRIS
BY

Patented June 30, 1953

2,644,132

UNITED STATES PATENT OFFICE 2,644,132

BATTERY TESTING METHOD

Soren L. Christie and Frank C. Marshall, Los Angeles, Calif., assignors to McColpin-Christie Corp., a corporation of California Application November 8, 1948, Serial No. 58,912

4 Claims. (Cl. 324—29)

Our invention relates in general to the testing of multicellular storage batteries and a primary object thereof is to provide a quick and reliable method of determining the condition of such a battery.

As is well known in the art, the condition of a storage battery may be determined by comparing the voltages of the individual cells of the battery and, more particularly, by determining the maximum difference between the voltages of the individual cells, i. e., the difference between the voltage of the cell having the highest voltage and the voltage of the cell having the lowest voltage. As an example, if such a comparison of the cell voltages of an ordinary 3-cell, 6-volt storage battery discloses that the difference between the maximum and the minimum cell voltages is 0.10 volt or more, a serious defect in the battery is indicated. A maximum cell voltage difference of the order of magnitude mentioned may, for example, indicate a partially short circuited cell, a broken cell, a crack in the battery case between adjacent cells, a reduction in active plate surface, the presence of impurities in the electrolyte, etc. Other conditions representing defects in a battery may also produce an excessive difference between the maximum and minimum cell voltages, as is well known in the art.

Heretofore, four general methods have been used, these being (1) determining the difference between the maximum and minimum cell voltages while the battery is being charged, (2) observing the cell voltages while the battery is substantially at rest (i. e., while the battery is being neither charged nor discharged), (3) determining the maximum cell voltage difference while the battery is being discharged at a high rate, and (4) measuring the overall voltage of the battery while it is being discharged at a high rate after completion of charging. As will be discussed in more detail in the following paragraphs, each of the foregoing conventional methods has serious disadvantages, and an important object of the present invention is to provide a method which obviates such disadvantages.

Considering in more detail the first conventional method outlined above, no definite conclusion can be drawn from the results of a cell voltage comparison test made while a battery is being charged unless the battery is fully charged, and then only limited conclusions can be drawn. In addition to the fact that only limited conclusions can be drawn from a cell voltage comparison test made in accordance with this method, the method is subject to another serious disadvantage in that it requires that the battery be fully charged. As a consequence, such a method has only limited application and is not feasible for testing storage batteries installed in automobiles for the reason that the driver of an automobile ordinarily does not have his battery tested until the battery has become discharged to an extent such that it no longer operates satisfactorily. Consequently, if the conventional method under consideration is employed, it is necessary either to delay the driver of the automobile until the battery is fully charged so that a cell voltage comparison test under charging conditions can be made, or to remove the battery from the automobile and provide the driver with a replacement battery until his battery can be tested. Obviously, both of these alternatives are undesirable in that they involve delay and also involve waste of power and effort in case the battery is later found to be defective.

Considering the second conventional method outlined above, a cell voltage comparison test made with the battery at rest will reveal many defects, such as short circuited cells, leaky cell walls, etc., if the battery has been at rest for an interval of from 24 to 48 hours. As is the case with the first conventional method discussed in the preceding paragraph, this method does not permit quick testing of batteries in automobiles.

The third conventional method outlined above, which involves making a cell voltage comparison test while the battery is being discharged at a high rate, is not feasible in many instances for the reason that batteries, particularly those installed in automobiles, are frequently not tested until discharged or substantially discharged. It will be apparent that if a discharge test is made on a battery which is already almost completely discharged, very misleading results may be obtained since all the cells of the battery may be so close to breaking down that any one may break down during the discharge test. This may occur even with a good battery which has become substantially discharged. Therefore, in order to make a cell voltage comparison test under discharge conditions, it is first necessary to give a substantially discharged battery an appreciable charge before performing the test. However, if such a discharge test is performed immediately after prolonged charging, the results will be of little value since the charging process usually temporarily eliminates small, yet significant, cell voltage differences caused by serious defects. Therefore, in order to obtain a reliable cell voltage comparison test under discharge conditions, it is necessary to wait several hours after the battery has been charged before performing the discharge test. As is the case with the first two conventional methods discussed above, this method does not permit quick testing of batteries.

The fourth conventional method has many serious disadvantages, particularly, in that testing cannot be performed until charging has been completed and in that the temperature of the battery must be taken into account. For simplicity, in order to eliminate the temperature variable, it has been the practice to charge all batteries until they reach a temperature of 125° F. even though in many cases this means harmful overcharging and excessive gassing. Also, in the conventional method being considered, the ampere-hour capacity of the battery must be taken into account. This is apt to cause condemnation of perfectly good batteries as many times there is no way for the operator to ascertain the ampere-hour rating. Thus, mistaking a 90 ampere-hour battery for a 100 ampere-hour battery may easily result in condemnation of a perfectly good battery. Another disadvantage is that at the high rate of discharge necessary the resistance of the electrolyte as well as the resistance of the plate surfaces appreciably influence the voltage at the battery terminals. A defect frequently causes both "sulphation" of the plates and dilution of the electrolyte (such as from 1.260 to 1.230 specific gravity). As these two effects influence the resistance of the battery in opposite directions they tend to cancel each other out, which oftentimes makes it impossible to detect faults by the high rate discharge test. Also with the overall voltage method, the deficiency in voltage of one cell may easily be cancelled out if the other two cells happen to be above normal.

In spite of the foregoing disadvantages of the four conventional methods of battery testing discussed above, these methods, and particularly the third and fourth methods discussed, have been the basis for commercial testing of batteries for many years because they have been the best methods available heretofore.

In view of the foregoing considerations, an important object of the present invention is to provide a method of determining the condition of a multicellular storage battery irrespective of the state of charge of the battery and in a matter of but a few minutes' times.

We have discovered that a reliable determination of the condition of a battery may be made by determining the difference between the maximum and minimum cell voltages which obtains immediately after a change in current flow through the battery and, preferably, immediately after termination of a charging current flow through the battery, the provision of such a battery testing method being an important object of the invention.

In general, the preferred embodiment of our invention involves charging the battery to be tested for a short interval of time, interrupting or terminating the charging current flow, and comparing the cell voltages which obtain immediately after termination of the charging current flow. More specifically, our method involves determining the maximum cell voltage difference which obtains immediately after termination of the charging current flow, or a quantity representative of such difference.

The purpose of initially charging the battery for a certain minimum period is to insure that the battery will not become discharged during the interval that the cell voltage comparison test is made since a slight discharge current flows through the test circuit during the cell voltage comparison test as will be discussed in more detail hereinafter. The discharge current flowing during the cell voltage comparison test is very small so that it is necessary to charge the battery initially for only a very short time interval. For example, we have found that it is usually unnecessary to charge the battery initially for a period of more than approximately one minute at 80 amperes on a standard 6-volt automotive battery, a charging time of from ½ minute to 1 minute being sufficient in most instances.

We have found that, for most reliable results, it is desirable that the cell voltage comparison test involve determining the maximum cell voltage difference, or a quantity representative thereof, which obtains within a few seconds after determination of the charging current, and preferably within about 2 seconds after termination of the charging current. In other words, it is desirable that the lapse of time between termination of the charging current flow and obtaining the data necessary to determine the maximum cell voltage difference be minimized as much as practicable.

We have found that our method will correctly diagnose the condition of a much larger percentage of defective batteries than will conventional methods such as those hereinbefore discussed, and will do so without hours of waiting. In other words, while such conventional methods may fail to detect a relatively large number of defective batteries, a much larger percentage of defective batteries will be detected and road failure thereby avoided, when tested in accordance with our method, which is an important advantage of our invention.

In some instances, our method may fail to condemn a defective battery because of the fact that the battery may have compensatory defects whose effects cancel each other so that a maximum cell voltage difference indicating a satisfactory battery is obtained. However, this is true to a much larger extent with prior conventional methods such as those hereinbefore described.

Another, and perhaps more important, advantage of our method is that it will not, insofar as we have been able to determine, condemn a battery having no defects warranting condemnation. On the other hand, it has been our experience that conventional testing methods such as those hereinbefore described frequently condemn batteries which are in satisfactory condition.

One reason for the foregoing advantageous results obtainable with our method is that any possibility of discharging an already substantially discharged battery during the test to such an extent that one or more of the cells may break down is eliminated because of the fact that the battery is subjected to only a very small discharge current for a short interval of time during the test, as will be discussed in more detail hereinafter. Another reason for the foregoing advantages of our method is that the initial charging period is so short that there is substantially no obscuring or elimination of the effects of defects on the maximum cell voltage difference obtaining during the charging period. As previously indicated, various of the conventional methods hereinbefore discussed result in the elimination, during the prolonged charging intervals necessary, of small, yet significant, cell voltage difference caused by defects.

In addition to the foregoing, an extremely important advantage of our battery testing method is that it permits determining the condition of a battery in a matter of a relatively few minutes, the total time required being determined by the length of time necessary for connecting suitable testing apparatus to the battery, the length of time required for initially charging the battery (which, as hereinbefore discussed, usually need not exceed one minute), the length of time required for obtaining the data necessary for determining the maximum cell voltage difference (which is a matter of but a few seconds), and the length of time required to disconnect the testing apparatus. Thus, our method is perfectly feasible for testing batteries in automobiles without removing the battery to be tested from the automobile and without delaying the driver of the automobile for more than a very few minutes, which is an important feature of the present invention. Furthermore, wasting power and time by charging defective batteries is avoided.

In the accompanying drawing, we show two exemplary embodiments of apparatus which may be employed for testing batteries in accordance with our method, although, as will be discussed in more detail hereinafter, various other apparatus may be employed to practice our method without departing from the spirit of the invention.

Figure 2:
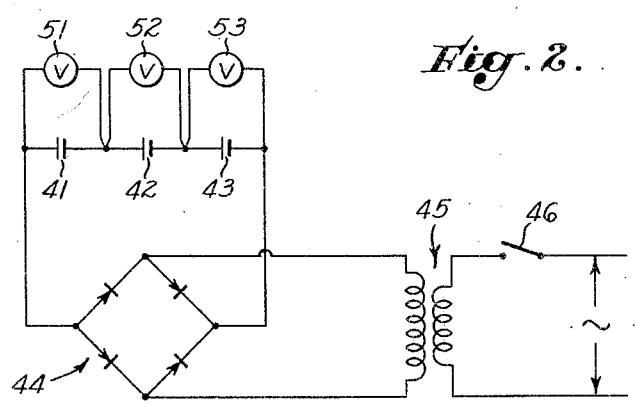

Referring to the accompanying drawing:

Fig. 1 diagrammatically illustrates one embodiment of a testing apparatus which may be employed to test a battery in accordance with the present invention; and, Fig. 2 diagrammatically illustrates another such embodiment.

Referring to Fig. 1 of the drawing, we show a suitable apparatus for testing a battery in accordance with our method, a 3-cell battery being shown for purposes of illustration. The individual cells are identified by the numerals 11, 12 and 13. The battery is connected to the output of a rectifier 14 having its input connected to the secondary of a transformer 15, the primary of the transformer being connected to a suitable alternating current source through a switch 16. Connected across the battery to be tested is a resistance 19 which is devided into as many equal parts as there are cells in the battery. In present instance, the resistance 19 is divided into three equal parts since a 3-cell battery is to be tested, the one-third points of the resistor being identified by the numerals 21 and 22.

Connected between the one-third point 21 and a point 23 between the cells 11 and 12 is an instrument 26 of the dynamometer or electrodynamometer type. Similarly, connected between the one-third point 22 and a point 24 intermediate the cells 12 and 13 is an instrument 27 of the dynamometer or electrodynamometer type. As is well known in the art, each of the instruments 26 and 27 include a movable coil and a stationary coil in series, the actuating forces for operating the instrument being produced by the interaction of the magnetic fields of the two coils. In the particular construction illustrated, the movable coils of the two instruments 26 and 27 are mechanically interconnected by a common shaft 28 which carries a pointer 29 or other suitable indicator, the interconnection being additive with respect to the torques produced by the movable coils. The apparatus illustrated in Fig. 1 of the drawing also includes bypass switches 31 and 32 connected in parallel with the respective instruments 26 and 27.

Considering the operation of the apparatus illustrated in Fig. 1 of the drawing, the operator first closes the switches 16, 31 and 32, the switches preferably being ganged for simultaneous operation. Closure of the switch 16 results in a flow of charging current through the battery to be tested, the purpose of closing the switches 31 and 32 being to prevent flow of the charging current through the instruments 26 and 27 during the charging period. The flow of charging current through the battery is maintained for only a short interval of time. The magnitude of the charging current and the length of time which it is maintained need be sufficient only to prevent completely discharging the battery during the subsequent cell voltage comparison test which will be described hereinafter. As an example, assuming that the battery to be tested is a standard 6-volt automotive storage battery, an 80 ampere charging current for a period of from one-half minute to one minute is ordinarily sufficient.

After the battery has been charged for the prescribed time interval, the operator opens the switches 16, 31 and 32 to terminate the flow of charging current and to connect the instruments 26 and 27 directly to the battery. The pointer 29 will then indicate on a suitable scale 30 a quantity representative of the difference between the maximum and minimum cell voltages. The operator observes the maximum reading occurring immediately after termination of the charging current flow through the battery, i. e., the operator observes the maximum reading occurring within a few seconds, preferably within two seconds, after termination of the charging current flow. The reading thus obtained is indicative of the condition of the battery.

If desired, the pointer 29 may be movable over a scale 30 which is calibrated in volts so that the operator may observe directly the maximum difference between the maximum and minimum cell voltages which occurred during the prescribed test interval. With a scale 30 so calibrated, if the maximum reading observed exceeds approximately 0.10 volt, the operator is advised that the battery has a defect warranting replacement. On the other hand, if the maximum reading observed is less than approximately 0.05 volt, condemnation of the battery is unwarranted. Alternatively, the pointer 29 may move over a scale 30 which is marked "good," "poor," and "bad." With such a scale, it is not necessary for the operator to convert the observed reading into terms of battery condition.

Considering the manner in which the instruments 26 and 27 provide a reading representative of the difference between the maximum and minimum cell voltages of the battery being tested, it will be apparent that if the voltages of the cells are all equal, no potential differences will obtain between the points 21 and 23 and between the points 22 and 24. Consequently, no deflection of the pointer 29 will occur. However, if the cell voltages differ, potential differences between either or both pairs of points 21—23 and 22—24 will exist to produce a deflection of the pointer 29. It will be noted that the instrument 26 will respond to a potential difference between the points 21 and 23, and, similarly, the instrument 27 will respond to a potential difference between the points 22 and 24. Thus, since the instruments 26 and 27 are interconnected by the shaft 28, the pointer 29 will indicate a quantity representative of the sum of the potential differences obtaining between the points 21 and 23 and the points 22 and 24, which quantity is representative of the difference between the maximum and minimum cell voltages.

As previously stated, the initial charge given to the battery to be tested need be sufficient only to prevent discharging of the battery to a point where one of the cells may break down during the brief interval of time necessary for obtaining the maximum indication provided by the pointer 29. In order to insure that the battery will not be discharged during the interval that the reading is obtained from the pointer 29, the resistance 19 is preferably made sufficiently high to insure that only a relatively small current will flow through the battery because of the presence of the resistance 19. For example, if a resistance 19 of fifteen ohms is employed, a current of considerably less than one ampere will flow through the battery because of the presence of the resistance 19 in the case of an ordinary 6-volt automotive storage battery. An inverse leakage current will flow through the rectifier 14 during the cell voltage comparison test, but this current is also small.

It will be apparent that a testing apparatus of the character shown in Fig. 1 of the drawing may be connected to a battery to be tested and the test performed in a matter of a very few minutes, the only connections to the battery which are necessary being at the points 23 and 24 and at points 33 and 34, which connections may be made readily. It will be noted that when the method of the present invention is employed in connection with an apparatus such as that shown in Fig. 1 of the drawing, the leads which are used for initially charging the battery are also used for the subsequent cell voltage comparison test, which is not possible with the conventional discharge method hereinbefore described. This and other advantages of using our method in connection with an apparatus such as that disclosed in Fig. 1 arise from the fact that the necessary reading is taken while only a slight current is flowing through the battery and the leads connected thereto. This results in the elimination of possible errors due to voltage drop in leads, clamps, etc., and in the elimination of possible errors due to variations in electrolytic resistance from one battery cell to another.

Another embodiment of an apparatus suitable for use in connection with the method of the present invention is shown in Fig. 2 of the drawing. Referring thereto, we show a battery having cells 41, 42 and 43, rectifier 44 being connected to the battery and having its input connected to the secondary of a transformer 45. The primary of the transformer is connected to a suitable source of alternating current through a switch 46. An initial charge may be given to the battery prior to making the cell voltage comparison test by closing the switch 46. With the apparatus illustrated in Fig. 2 of the drawing, the voltages of the cells 41, 42 and 43 are determined directly by volt meters 51, 52 and 53 respectively connected thereacross.

The procedure in testing a battery in accordance with our method with the apparatus shown in Fig. 2 of the drawing is substantially the same as with the apparatus shown in Fig. 1. The only difference is that it is necessary for the operator to take three readings instead of one immediately after termination of the charging current flow through the battery. Also, it is necessary for the operator to exercise some skill with the apparatus shown in Fig. 2 in order to obtain the maximum difference between the maximum and minimum cell voltages which occurs during the desired short interval following termination of the charging current flow. For this reason, the apparatus shown in Fig. 1 of the drawing is to be preferred over that shown in Fig. 2 since, with the former, it is merely necessary for the operator to determine the maximum reading provided by the pointer 29 during the prescribed period following termination of charging.

In addition to the apparatuses illustrated in Figs. 1 and 2 of the drawing, our method may be practised with any of the apparatuses shown in Figs. 1 to 5 of the drawing of the application of Soren L. Christie, one of the inventors of the method of the present invention, which application was filed March 22, 1948 and which bears Serial No. 16,258, now Patent No. 2,613,248.

Since the method of the present invention may be employed to determine the condition of a battery in connection with various apparatuses other than those hereinbefore referred to, it will be understood that we do not intend to be limited to the use of any particular apparatus in connection with our method, and we hereby reserve the right to variations of our method which properly come within the scope of the invention as set forth in the appended claims.

We claim as our invention:

1. A method of determining the condition of a multicellular battery, including the steps of: charging the battery at a rate of the order of magnitude of 75 amperes for a period of time of the order of magnitude of one minute, and continuously measuring electrical quantities representative of the maximum difference between the voltages of the individual cells of the battery for a period of time of up to about 5 seconds after termination of said charging, beginning at the instant said charging is terminated.

2. A method of determining the condition of a multicellular battery, including the steps of: charging the battery at a rate of the order of magnitude of 75 amperes for a period of time of the order of magnitude of one minute, and measuring electrical quantities representative of the maximum difference between the voltages of the individual cells of the battery which obtains within about 5 seconds after termination of said charging.

3. A method of determining the condition of a multicellular battery, including the steps of: charging the battery at an ampere rate of the order of magnitude of the ampere hour rating of the battery for a period of time of the order of magnitude of one minute, and continuously measuring electrical quantities representative of the maximum difference between the voltages of the individual cells of the battery for a period of time of up to about 5 seconds after termination of said charging, beginning at the instant said charging is terminated.

4. A method of determining the condition of a multicellular battery, including the steps of: charging the battery at an ampere rate of the order of magnitude of the ampere hour rating of the battery for a period of time of the order of magnitude of one minute, and measuring electrical quantities representative of the maximum difference between the voltages of the individual cells of the battery which obtains within about 5 seconds after termination of said charging.

SOREN L. CHRISTIE.
FRANK C. MARSHALL.

References Cited in the file of this patent

UNITED STATES PATENTS

| Number | Name | Date |
|---|---|---|
| 972,210 | Motsinger | Oct. 11, 1910 |
| 1,922,792 | Cain | Aug. 15, 1933 |
| 2,101,571 | Breisch | Dec. 7, 1937 |
| 2,270,554 | Pugh | Jan. 20, 1942 |
| 2,347,452 | Amsden | Apr. 22, 1944 |